(12) United States Patent
Perri et al.

(10) Patent No.: US 9,073,400 B2
(45) Date of Patent: Jul. 7, 2015

(54) MOTOR VEHICLE MULTI-LINK SUSPENSION SYSTEM INCLUDING A TRANSVERSE LEAF SPRING

(71) Applicant: Fiat Group Automobiles S.p.A., Turin (IT)

(72) Inventors: Eugenio Perri, Milan (IT); Bruno Martina, Turin (IT)

(73) Assignee: FIAT GROUP AUTOMOBILES S.p.A., Turin (IT)

( * ) Notice: Subject to any disclaimer, the term of this patent is extended or adjusted under 35 U.S.C. 154(b) by 0 days.

(21) Appl. No.: 14/268,592

(22) Filed: May 2, 2014

(65) Prior Publication Data

US 2014/0327219 A1    Nov. 6, 2014

(30) Foreign Application Priority Data

May 2, 2013   (IT) .............................. TO2013A0354

(51) Int. Cl.
 *B60G 7/02* (2006.01)
 *B60G 11/08* (2006.01)
 *B60G 7/00* (2006.01)

(52) U.S. Cl.
 CPC ................ *B60G 11/08* (2013.01); *B60G 7/008* (2013.01); *B60G 2200/18* (2013.01);
 (Continued)

(58) Field of Classification Search
 CPC .. B60G 11/02; B60G 11/08; B60G 2202/114; B60G 2204/41; B60G 2204/121
 USPC ....... 280/124.109, 124.135, 124.17, 280/124.171, 124.175; 267/52
 See application file for complete search history.

(56) References Cited

U.S. PATENT DOCUMENTS 1,527,437 A * 2/1925 Pape .............................. 267/244
1,884,474 A   10/1932 Wolforth
(Continued)

FOREIGN PATENT DOCUMENTS

DE        3243434 A1   5/1984
DE   102008049761 A1   4/2010
(Continued)

OTHER PUBLICATIONS

L. De Goncourt et al., Une Suspension Automobile En Composite, Composites, Mar. 25, 1985, pp. 31-38, No. 2, Berlin and Co., Paris, France.
(Continued)

*Primary Examiner* — Paul N Dickson
*Assistant Examiner* — Robert A Coker
(74) *Attorney, Agent, or Firm* — Heslin Rothenberg Farley & Mesiti P.C.; Victor A. Cardona, Esq.

(57) ABSTRACT

A motor-vehicle multi-link suspension system includes, for each wheel, two lower transverse arms and a substantially longitudinal or inclined lower arm, each having one end pivotally connected to a respective wheel support and the opposite end pivotally connected to the motor-vehicle structure. A leaf spring is arranged transversally with respect to the longitudinal direction of the motor-vehicle. The leaf spring is supported by elastic supports arranged symmetrically at intermediate positions between the center of the leaf spring and the ends thereof. Ends of the leaf spring are pivotally connected to upper parts of the two wheel supports. Two jack-type shock absorbers have opposite ends swingably connected to the respective wheel support and the motor-vehicle structure. The end portions of the leaf spring also fulfill the function of triangular upper transverse arms of the multi-link suspension. Preferably the leaf spring is made of a composite material.

11 Claims, 8 Drawing Sheets

(52) U.S. Cl.
CPC .... *B60G 2200/422* (2013.01); *B60G 2202/114* (2013.01); *B60G 2204/121* (2013.01); *B60G 2204/129* (2013.01); *B60G 2206/7101* (2013.01)

(56) References Cited

U.S. PATENT DOCUMENTS

| | | | | |
|---|---|---|---|---|
| 3,157,395 | A | * 11/1964 | Budzynski et al. | 267/227 |
| 3,181,641 | A | 5/1965 | Haddad | |
| 3,204,717 | A | * 9/1965 | Collins | 180/256 |
| 3,917,306 | A | * 11/1975 | Madler et al. | 280/104 |
| 4,458,918 | A | * 7/1984 | Rumpel | 280/124.143 |
| 4,509,774 | A | * 4/1985 | Booher | 280/124.134 |
| 4,557,500 | A | * 12/1985 | Collard et al. | 280/124.145 |
| 4,613,152 | A | * 9/1986 | Booher | 280/124.145 |
| 4,771,997 | A | * 9/1988 | Haldenwanger et al. | 267/260 |
| 4,779,893 | A | 10/1988 | Juechter | |
| 6,029,987 | A | * 2/2000 | Hoffman et al. | 280/124.171 |
| 6,189,904 | B1 | * 2/2001 | Gentry et al. | 280/124.175 |
| 2002/0000703 | A1 | 1/2002 | Lawson et al. | |

FOREIGN PATENT DOCUMENTS

| | | |
|---|---|---|
| EP | 0685354 A1 | 12/1995 |
| EP | 1120298 A1 | 8/2001 |
| EP | 1645445 A1 | 4/2006 |
| EP | 2030813 A1 | 3/2009 |
| EP | 2540533 A2 | 6/2012 |
| FR | 1148699 | 3/1956 |
| FR | 1293498 | 6/1961 |
| FR | 2832098 A1 | 5/2003 |
| FR | 2863206 A1 | 6/2005 |
| GB | 1205850 | 9/1970 |
| WO | 2006025780 A1 | 3/2006 |
| WO | 2009121353 A1 | 10/2009 |

OTHER PUBLICATIONS

Italian Search Report from corresponding Italian Patent Application No. IT TO20140354 dated Nov. 5, 2013.

* cited by examiner

MOTOR VEHICLE MULTI-LINK SUSPENSION SYSTEM INCLUDING A TRANSVERSE LEAF SPRING

CROSS REFERENCE TO RELATED APPLICATIONS

This application claims priority from Italian Patent Application No. TO 2013 A 000354 filed on May 2, 2013, the entire disclosure of which is incorporated herein by reference.

FIELD OF THE INVENTION

The present invention relates to motor-vehicle suspension systems, of the type comprising:
- at least one transverse arm and at least one substantially longitudinal or inclined arm for each wheel, each having one end pivotally connected to a respective wheel support and the opposite end pivotally connected to a supporting structure of the motor-vehicle,
- a suspension spring that counteracts the vertical movements of the two wheel supports, consisting of a leaf spring arranged transversally to the longitudinal direction of the vehicle, with its general plane lying horizontally, and connected to the motor-vehicle supporting structure with the interposition of elastic supports arranged symmetrically at intermediate positions between the centre of the leaf spring and the ends thereof, said ends of the leaf spring being connected to the two wheel supports, and
- two jack-type shock absorbers interposed between the wheel supports and the supporting structure of the motor-vehicle.

PRIOR ART

A suspension system of the above indicated type is for example disclosed in FR-A-2 832 098. This known solution relates to a suspension system of the MacPherson type, in which the transverse leaf spring is located in a position relatively close to the ground and has its ends connected to the lower part of each wheel support, according to a configuration which is not compatible with a vehicle axle with driven wheels. Moreover, in this known type of suspension the shock-absorber is rigidly connected, rather than being pivoted, to the wheel support, U.S. Pat. No. 3,181,641 A discloses a suspension system in which a transverse leaf spring is provided having its opposite ends pivotally connected to the upper parts of the two wheel supports, However the configuration of this leaf spring and the way in which the leaf spring is connected to the motor vehicle supporting structure do not enable the leaf spring of this known solution to efficiently counteract movements along a direction transverse to the longitudinal direction of the vehicle.

OBJECT OF THE INVENTION

The object of the present invention is that of providing a suspension system of the type indicated at the beginning of the present description, which ensures best results both from the standpoint of travel comfort, driving safety and structure reliability and from the standpoint of simplicity of construction and reduction of dimensions and weight.

SUMMARY OF THE INVENTION

In view of achieving the above indicated object, the present invention provides a motor-vehicle suspension system comprising:
- at least one transverse arm for each wheel support having one end pivotally connected to the respective wheel support and the opposite end pivotally connected to a motor-vehicle supporting structure,
- a suspension spring which counteracts the vertical movements of the two wheel supports, consisting of a leaf spring arranged transversally with respect to the longitudinal direction of the motor-vehicle, said leaf spring having its general plane lying horizontally and connected to the motor-vehicle supporting structure with the interposition of elastic supports arranged asymmetrically at positions intermediate between the centre of the leaf spring and the ends thereof, said ends of the leaf spring being pivotally connected to the two wheel supports at the upper part of each wheel support, and
- two jack-type shock absorbers interposed between the wheel supports and the motor-vehicle supporting structure, characterized in that:
said suspension is a multi-link suspension, in which each wheel support is connected to the motor-vehicle supporting structure by means of two lower transverse arms, a substantially longitudinal or inclined lower arm and at least an upper transverse arm constituted by the respective end portion of the leaf spring, and wherein each jack-type shock absorber has its opposite ends swingably connected to the respective wheel support as well as to the motor-vehicle supporting structure,
in that said leaf spring comprises a single leaf in a one-piece construction, preferably of composite material, which comprises two portions having enlarged thickness at said intermediate positions for connection to the respective elastic supports, each of said portions of enlarged thickness on its turn comprising two seats for two respective elastic supports connected to the motor-vehicle supporting structure, said seats being spaced apart from each other and being aligned along the longitudinal direction of the motor-vehicle, and
in that said leaf spring has a width in the longitudinal direction of the motor-vehicle which has its maximum value at said intermediate portions of enlarged thickness and in that the end portions of the leaf spring extending beyond said intermediate portions have a triangular configuration, with a base connected to the motor-vehicle supporting structure by means of said elastic supports and an apex directed towards the end of the leaf spring and pivoted to the wheel support.

Due to the above mentioned features the suspension according to the invention ensures all the advantages of a multi-link suspension, while adding an advantage with respect to a conventional multi-link suspension consisting in avoiding use of conventional helical springs with their associated abutment discs, stabilizing rod and upper transverse arms. In one practical example, the resulting reduction in weight was of about 17 Kg. In addition to this, a greater simplicity of construction and a reduction in size are also achieved.

The above mentioned leaf spring comprises a single leaf, in a one-piece construction, preferably of a composite material including a synthetic resin matrix reinforced with fibers such as glasses fibers.

According to a further feature of the preferred embodiment, each of said seats for the elastic supports of said leaf springs is defined by a vertical through aperture formed at each of said portions of enlarged thickness of the leaf spring. Each elastic support of the leaf spring comprises an outer tubular element which is rigidly anchored within the respective seat for the leaf spring, an inner tubular element secured by a screw to the motor-vehicle supporting structure, and an annular body of elastomeric material connecting said outer and inner tubular elements to each other.

Also in the case of the preferred embodiment, to each end of the leaf spring there is rigidly secured a connecting portion which is pivotally connected to the respective wheel support.

As will be described more in detail in the following, the leaf spring is configured and supported so that its elastic counter-action to the vertical movement of one wheel is different depending upon whether the two wheels associated to the suspension have symmetrical movements (i e. with the two wheels moving both upwardly or downwardly) or asymmetrical movements (i.e. with one wheel moving upwardly and the other moving downwardly).

As indicated, the leaf spring has a width along the longitudinal direction of the motor-vehicle which has a maximum value at said intermediate portions of enlarged thickness. The end portions of the leaf spring extending beyond said intermediate portions have a triangular configuration with a base connected to the motor-vehicle supporting, structure by said elastic supports and an apex at the end of the leaf spring which is pivoted to the wheel support.

Therefore, the ends of the leaf are equivalent to independent triangular arms with pivoting axes at the connection to the motor-vehicle supporting structure which are parallel to the longitudinal direction of the motor-vehicle.

One further feature of the invention lies in that, in plan view, the theoretical axis connecting the two opposite ends of the leaf spring is substantially adjacent to, or coincident with, the axis of the two wheels which are associated to the suspension system. By this arrangement a reduction. or total elimination, is obtained of the moments originated around this axis by forces applied to each end of the leaf spring.

The suspension system according to the invention can be used particularly advantageously for a rear suspension associated with a vehicle having a rear-wheel traction system or a four-wheel traction system, including a rear differential provided with semi-axles connected to the rear wheels of the vehicle, in this application, said leaf spring extends above said differential and said semi-axles.

Also in the case of the preferred embodiment, the ends of the lower transverse arms and the lower longitudinal arms which are connected to the motor-vehicle supporting structure are directly connected to an auxiliary frame which is connected to the motor-vehicle supporting structure by means of elastic supports. Preferably, this auxiliary frame comprises a sheet-metal structure having a double H-shaped configuration, including two longitudinal beams connected to each other by two longitudinally spaced apart cross-members, the two longitudinal beams having their ends connected to the motor-vehicle supporting structure by elastic supports Due to the above indicated features, the suspension system according to the invention provides all the advantages of a multi-link suspension also for a vehicle axis provided with wheel traction and the further advantage of a structure which is simple, includes a reduced number of components and has reduced bulk and weight.

BRIEF DESCRIPTION OF THE FIGURES

Further features and advantages of the invention will become apparent from the following description with reference to the annexed drawings, given purely by way of non limiting example, in which.

DETAILED DESCRIPTION OF A PREFERRED EMBODIMENT

In the drawings, reference numeral 1 generally designates one preferred embodiment of a rear suspension according to the invention, for a motor-vehicle having a rear-wheel or four-wheel traction, comprising a differential D with respective semi-axles A connected to the two rear wheels R of the motor-vehicle. Wheels R (of which only the brake discs are shown) are rotatably mounted on wheel supports S. The suspension is of the multi-link type, in which each wheel support S is connected to the motor-vehicle supporting structure by means of two transverse lower arms T1, T2, a substantially longitudinal or inclined lower arm L and an upper triangular transverse arm, which, according to the teachings of the present invention, is defined by one end portion of a leaf spring LF arranged transversally with respect to the longitudinal direction of the motor vehicle, as will be described more in detail in the following.

Figure 3:
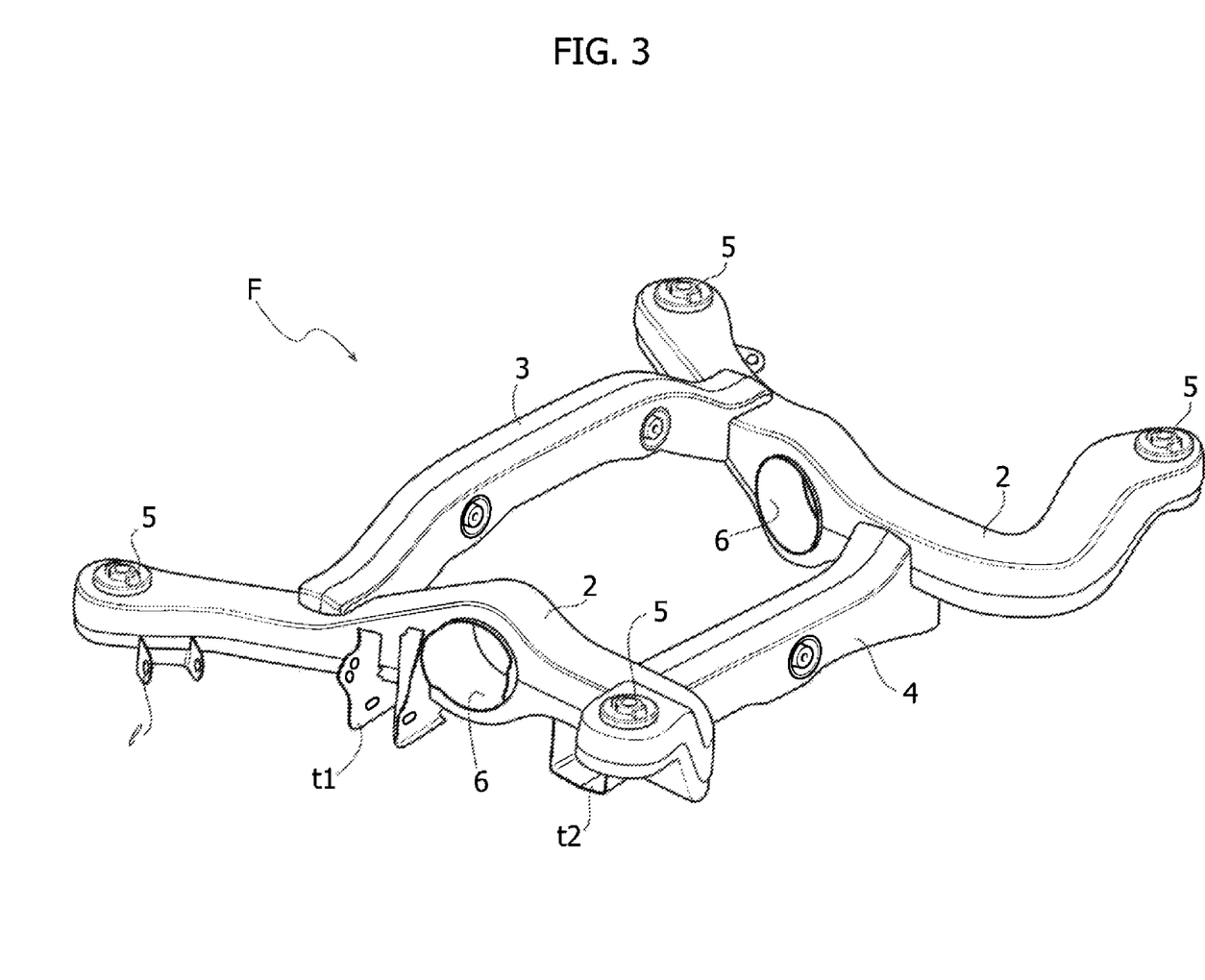
FIG. 3 shows a perspective view of an auxiliary frame forming part of the preferred embodiment of the suspension according to the invention.
Figure 4:
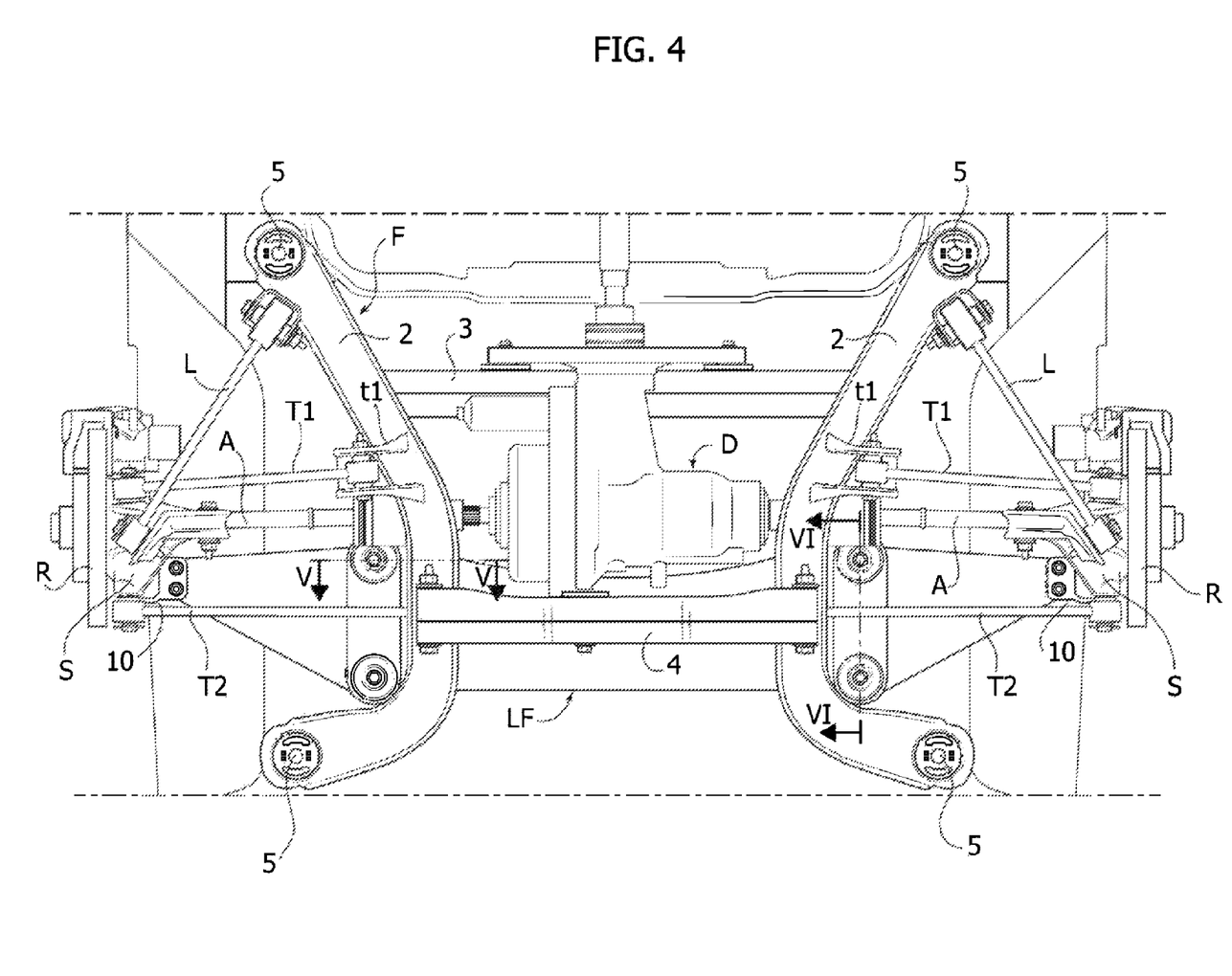
FIG. 4 is a bottom view of the suspension of FIGS. 1-3 in the mounted condition on a motor-vehicle.

Each of the arms T1, T2, L has one end pivotally connected to the lower part of the respective wheel support S and the opposite end pivotally connected to the motor-vehicle supporting structure. According to a technique known per se, the pivotal connection of each end of said arms T1, T2, L is obtained by means of elastic bushes or alternatively by means of ball joints In the specific example which is shown here with non-limiting purposes, the ends of said arms T1, T2, L which are opposite to those connected to the wheel supports S are pivotally connected to an auxiliary frame F which is secured on its turn to the motor-vehicle structure. With reference in particular to FIG. 3. in this embodiment said frame F has a double H-shaped and general configuration, made of box-like elements of metal sheet, defining two substantially longitudinal beams 2 connected to each other by two cross-members 3, 4 which are longitudinally spaced apart from each other. The ends of the longitudinal beams 2 are provided with elastic supports 5 for connection to the motor-vehicle structure. Moreover the longitudinal beams 2 have large apertures 6 at their intermediate area, for passage of semi-axles A. To each longitudinal beam 2 there are secured brackets $t_1$ for the pivotal connection of arms T1 and L, whereas each arm T2 is pivotally connected within an opened end $t_2$ of cross-member 4.

Figure 1:
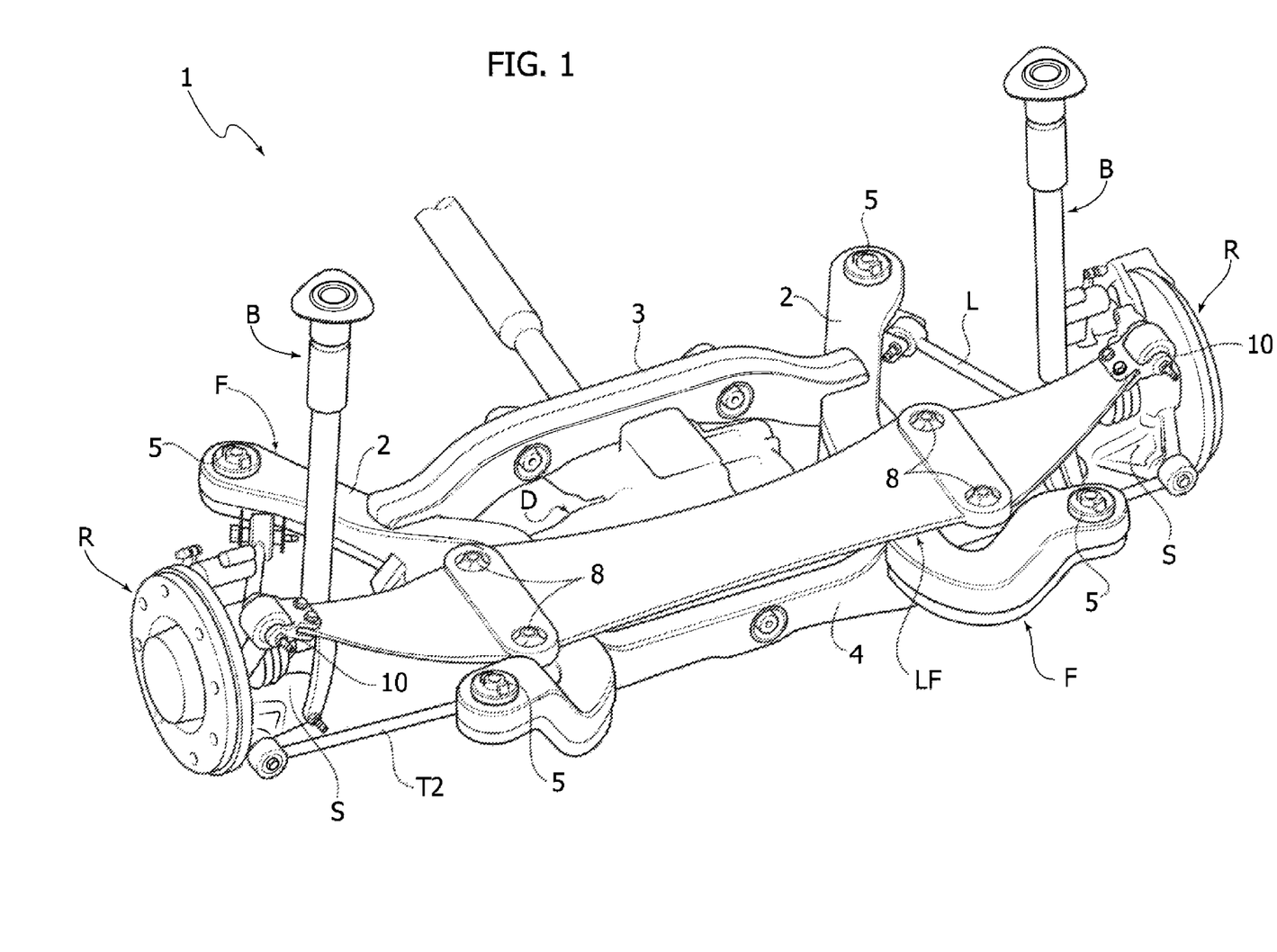
FIG. 1 shows a perspective view of one preferred embodiment of a motor-vehicle rear suspension according to the present invention.
Figure 2:
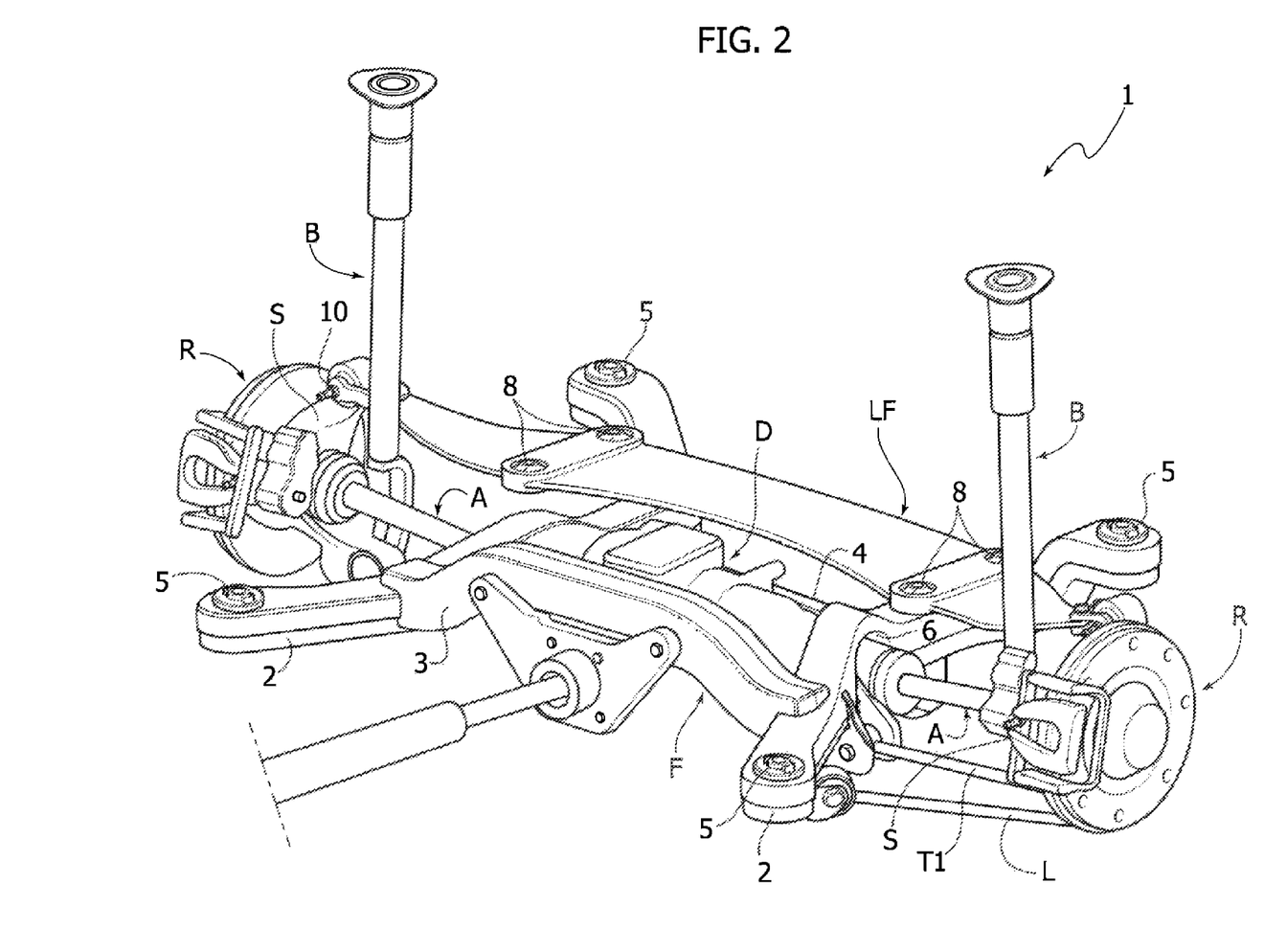
FIG. 2 shows a further perspective view of the suspension of FIG. 1.

As shown in particular in FIG. 2, the auxiliary frame F is also used for supporting the differential unit D.

According to a known technique, with each wheel support S there is associated a jack-type shock absorber B having its opposite ends swingably connected to the motor-vehicle structure and the wheel support, respectively.

As shown in the drawings, the spring of the suspension according to the invention is constituted by the transverse leaf spring LF, which, in the example shown herein, has a single leaf whose general plane is substantially horizontal.

In the preferred embodiment, said leaf LF is made of a composite material, comprising a synthetic resin matrix reinforced with fibers, such as glass fibers or others, even if the possibility of a leaf made of steel is not excluded, Leaf spring LF is directly supported by the motor-vehicle structure by means of elastic supports 8 arranged symmetrically at intermediate positions between the centre of the leaf spring and its ends. More precisely, at said intermediate positions leaf spring LF has two portions 7 with enlarged thickness (see in particular FIGS. 8, 9). Each portion 7 on its turn has two seats for respective elastic supports 8 for connection to the motor-vehicle structure, which are spaced apart from each other and aligned along the longitudinal direction of the motor-vehicle. Leaf spring LF further has two end portions 9, extending beyond intermediate portions 7 and having a tapered configuration, with a width along the longitudinal direction of the motor-vehicle decreasing towards the respective end (see FIG. 9).

To each end of the leaf spring LF there is bolted a fork-shaped bracket 10 for pivotal connection of the respective end of leaf spring LF to the respective wheel support S, at an upper part of this wheel support. Similarly to the other arms of this suspension, also this pivotal connection is provided by means of an elastic bush of any known type (not shown in the drawings) or alternatively by means of a ball joint.

Due to the above described arrangement, leaf LF not only fulfils the function of suspension spring, but its end portions 9 also constitute the triangular upper transverse arms of the suspension.

Figure 5:
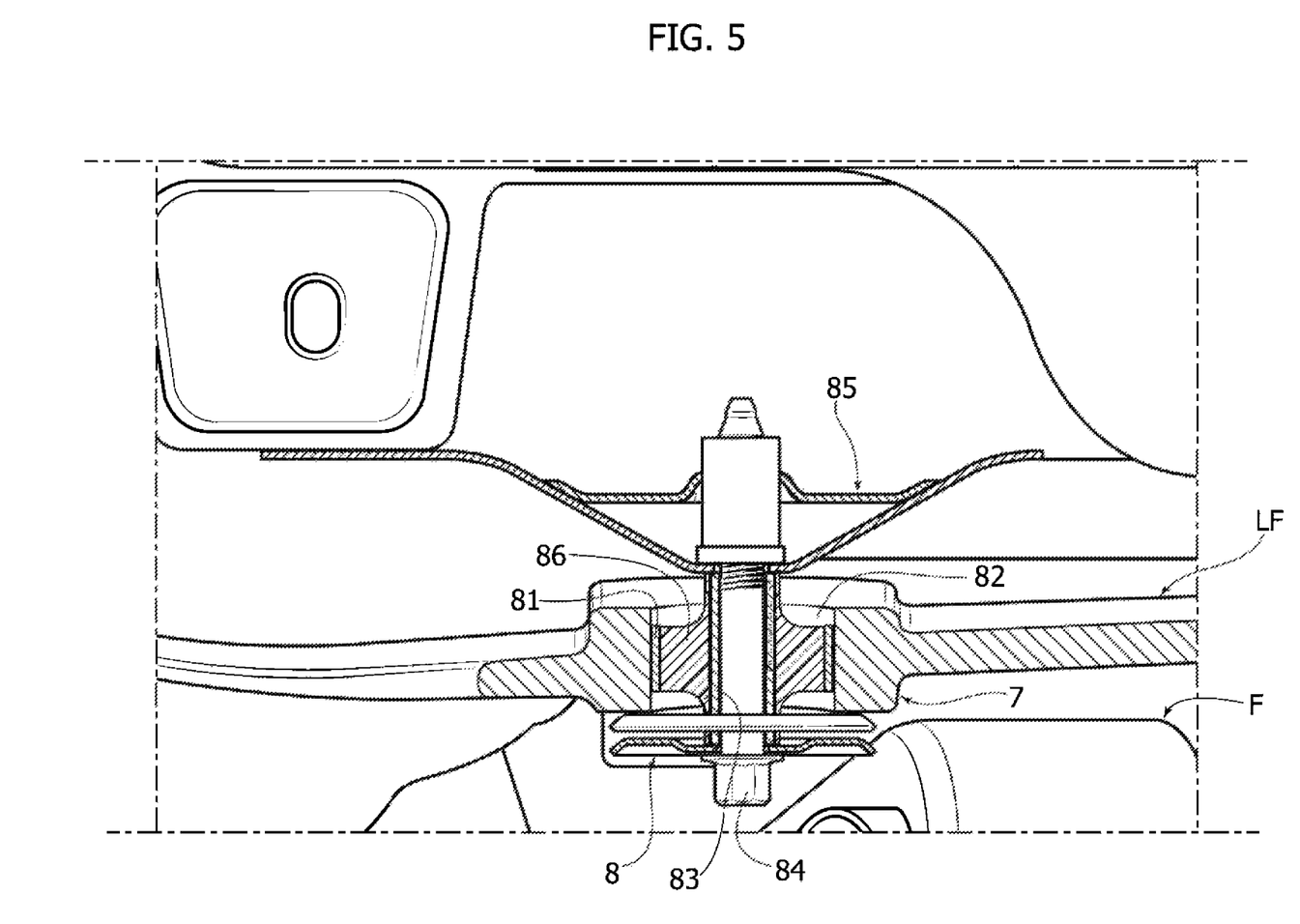
FIGS. 5, 6 show cross-sections along lines V-V and VI-VI of FIG. 4 at an enlarged scale.
Figure 6:
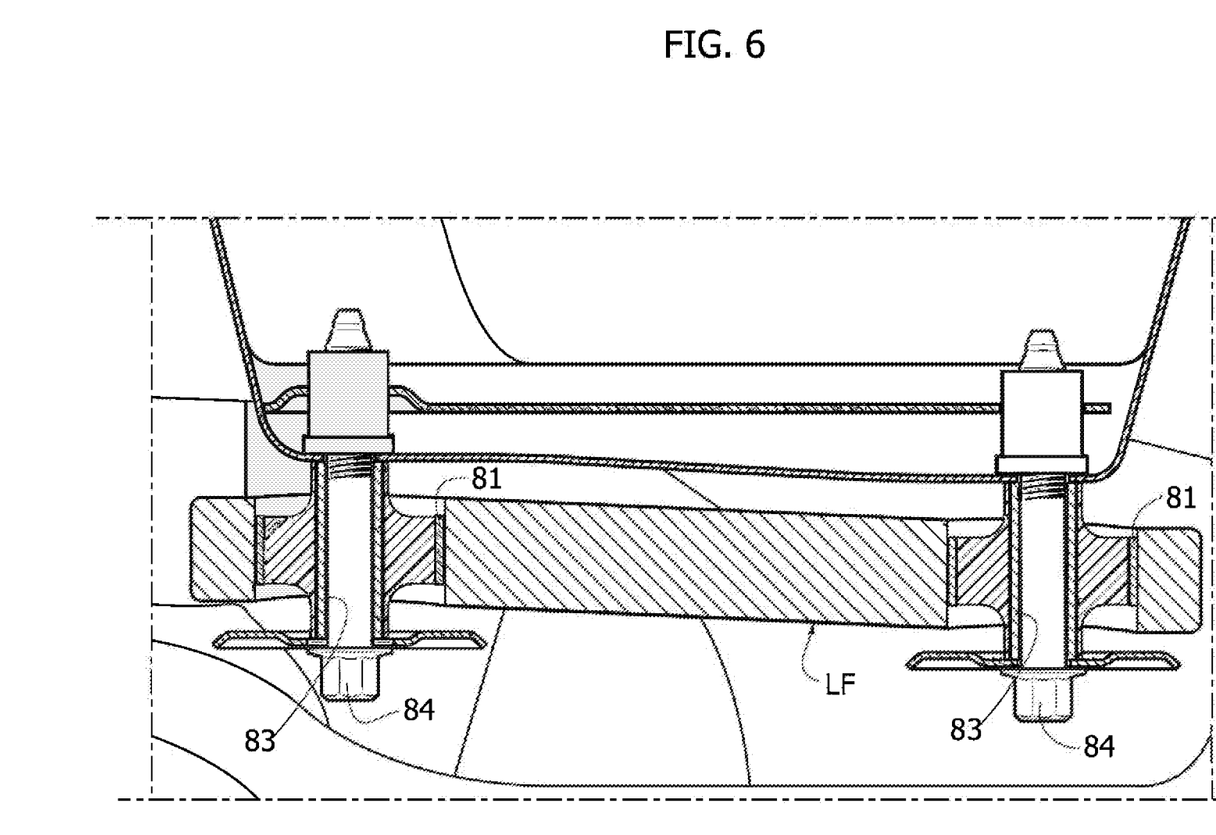
Figure 7:
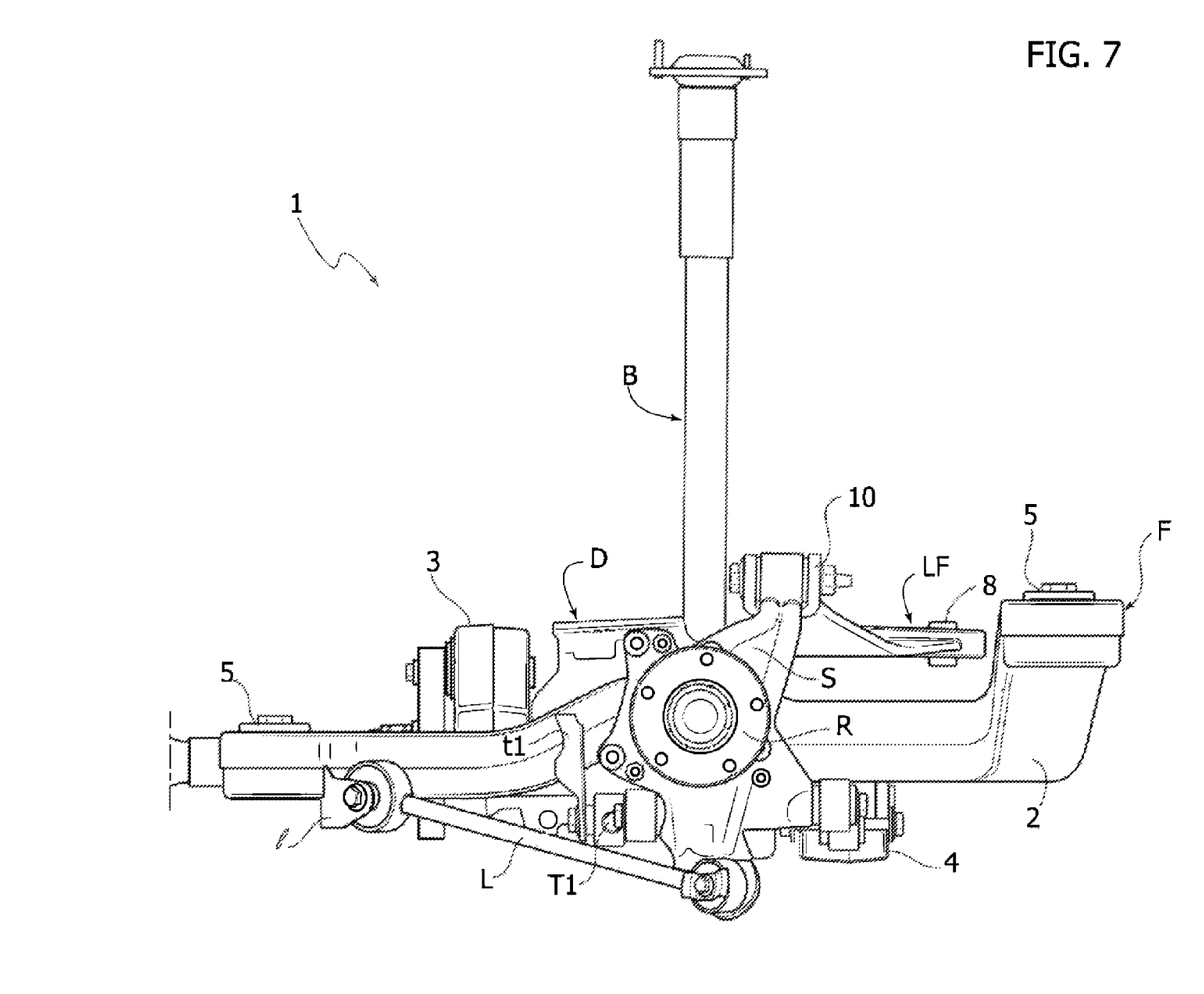
FIG. 7 shows a side elevational view of the suspension and, FIGS. 8, 9 show a front view and a plan view of the leaf spring of the suspension according to the invention in one actual embodiment.

FIGS. 5, 6 show, at an enlarged scale, one exemplary embodiment of the elastic supports which connect the portions 7 of enlarged thickness of spring LF to the motor-vehicle structure. As illustrated, each elastic support 8 comprises an outer tubular element 81 which is rigidly anchored within a through aperture 82 formed in the enlarged portion 7 of the leaf LF and constituting the seat for the elastic support. The elastic support 8 further comprises an inner metal tubular element 83 arranged coaxially within element 81 and secured by means of a bolt 84 to a box-like structure 85 of metal sheet forming part of the motor-vehicle body. Finally, the elastic support 8 comprises a bush 86 of elastomeric material interposed between the two metal tubular elements 81, 83 and vulcanized thereon so as to connect these elements to each other.

As a result of the above described arrangement of the leaf spring LF with its opposite ends pivotally connected to the upper parts of the two wheel supports S, this leaf spring is arranged above differential D and semi-axles A.

Figure 8:
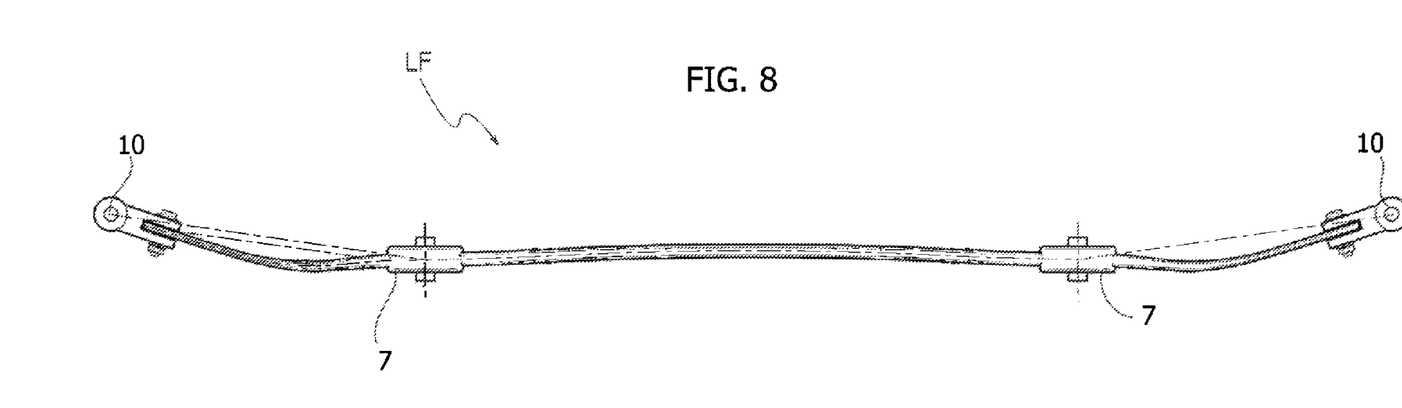
Figure 9:
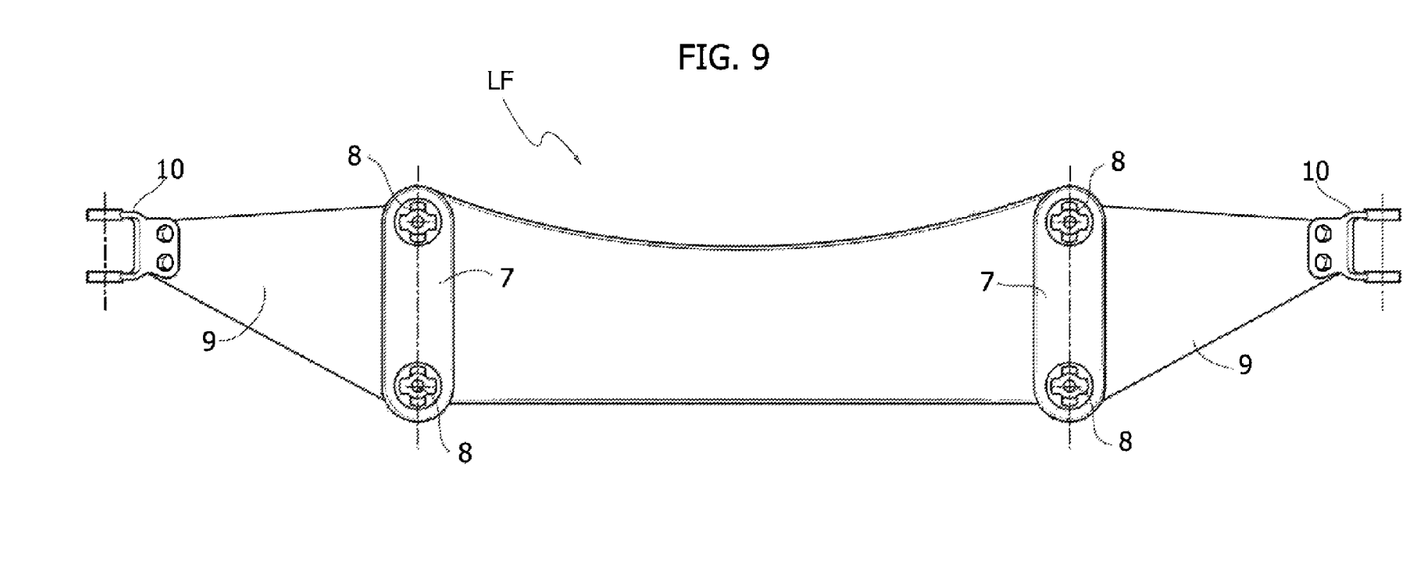

Due to this measure, the leaf spring LF not only fulfils the function of suspension spring, but also constitutes the two triangular upper transverse arms of the multi-link suspension with its end portions 9. The exemplary embodiment shown in FIGS. 8, 9 is also to be considered as a reference of the preferred proportions between length, width and thickness of the leaf spring LF.

In the preferred embodiment, the theoretical axis connecting the opposite ends of leaf spring LF is substantially coincident with or substantially adjacent to the axis of wheels R. A substantial reduction is thereby obtained of the moments with respect to the wheel axis which are generated by forces applied to the ends of the leaf spring LF If necessary in order to avoid interference with the jack-type shock absorbers B, the end portions 9 of leaf spring LF can each have an aperture for passage of the jack-type shock absorbers B therethrough.

As a result of the configuration shown herein, and of the way in which leaf spring LF is supported, this leaf spring counteracts the vertical movements of each wheel R with an elastic reaction force which is different, depending upon whether the two wheels have a symmetrical movements (i.e. with both wheels moving upwardly or downwardly) or asymmetrical movements (i.e. with one wheel moving upwardly and the other moving downwardly). This is due to that in the first case the entire length of the leaf spring LF acquires an arched configuration whereas in the second case, the central part of the leaf spring LF keeps a substantially straight configuration between the two portions 7 of enlarged thickness, whereas the two end portions 9 are arched in two opposite directions As clearly apparent from the foregoing description, the suspension according to the invention ensures all the advantages of a multi-link suspension compatible with a wheel traction system, and further has an extremely simple structure made of a reduced number of components and having a reduced bulk and weight.

Naturally, while the principle of the invention remains the same, the details of construction and the embodiments may widely vary with respect to what has been described and illustrated purely by way of example, without departing from the scope of the present invention.

What is claimed is:

1. A motor-vehicle suspension system, comprising:
   at least one transverse arm for each wheel support, having one end pivotally connected to a respective wheel support of two wheel supports and an opposite end pivotally connected to a motor-vehicle supporting structure of a motor-vehicle,
   a suspension spring of a suspension, said suspension spring counteracts vertical movements of the two wheel supports and consists of a leaf spring arranged transversally with respect to a longitudinal direction of the motor-vehicle with a general plane lying horizontally and connected to the motor-vehicle supporting structure by elastic supports arranged symmetrically at intermediate positions between a center of the leaf spring and ends thereof, the ends of the leaf spring being pivotally connected to the two wheel supports at an upper part of each wheel support,
   two jack-type shock absorbers interposed between the wheel supports and the motor-vehicle supporting structure,
   said suspension being a multi-link suspension, in which each wheel support is connected to the motor-vehicle supporting structure by means of two transverse lower arms of said at least one transverse arm, a substantially longitudinal or inclined lower arm and at least one upper transverse arm formed by an end portion of the leaf spring, and wherein each jack-type shock absorber has opposite ends swingably connected to the respective wheel support and the motor-vehicle supporting structure,
   said leaf spring comprising a single leaf in a one-piece construction, said leaf spring comprising two portions of enlarged thickness at said intermediate positions for connection to respective elastic supports of the elastic supports, each of said portions of enlarged thickness comprising two seats for two respective elastic supports of the elastic supports connected to the motor-vehicle supporting structure, said seats being spaced apart from each other and aligned along the longitudinal direction of the motor-vehicle, and said leaf spring having a width along the longitudinal direction of the motor-vehicle which has a maximum value at said intermediate portions of enlarged thickness, and the end portions of the leaf spring which extend beyond said intermediate portions having a triangular configuration, with a base secured to the motor-vehicle supporting structure by said elastic supports and an apex at the end of the leaf spring, which is pivotally connected to the wheel support.

2. The suspension system according to claim 1, wherein each of said seats for the elastic supports of said leaf spring is defined by a vertical aperture provided in each of said portions of enlarged thickness of said leaf spring and in that each elastic support of the leaf spring comprises an outer tubular element, which is rigidly anchored within the respective seat of the leaf spring, an inner tubular metal element, secured by means of a screw to the motor-vehicle structure, and an annular body of elastomeric material which connects said outer and inner tubular elements to each other.

3. The suspension system according to claim 2, wherein said leaf spring is configured and supported so that an elastic reaction of said leaf spring to the vertical movement of one wheel is different depending upon whether the two wheels associated with the suspension have symmetrical or asymmetrical movements.

4. The suspension system according to claim 1, wherein to each end of the leaf spring there is rigidly secured one attachment portion which is pivotally connected to the respective wheel support.

5. The suspension system according to claim 4, wherein said leaf spring is configured and supported so that an elastic reaction of said leaf spring to the vertical movement of one wheel is different depending upon whether the two wheels associated with the suspension have symmetrical or asymmetrical movements.

6. The suspension system according to claim 1, wherein said leaf spring is configured and supported so that an elastic reaction of said leaf spring to the vertical movement of one wheel is different depending upon whether the two wheels associated with the suspension have symmetrical or asymmetrical movements.

7. The suspension system according to claim 1, wherein, in plan view, a theoretical axis connecting the two opposite ends of the leaf spring is substantially adjacent to or coincident with, an axis of two wheels mounted on said wheel supports.

8. The suspension system according to claim 7, wherein the suspension comprises a rear suspension associated with a vehicle provided with rear-wheel traction or four wheel traction, including a rear differential provided with semi-axles connected to the rear wheels of the vehicle, and said leaf spring extends above said differential and said semi-axles.

9. The suspension system according to claim 1, wherein the ends connected to the motor-vehicle structure of the lower transverse arms and the longitudinal or inclined lower arms are connected to an auxiliary frame connected to the motor-vehicle structure by elastic supports.

10. The suspension system according to claim 9, wherein said auxiliary frame comprises a structure of metal sheet having a double H-shaped configuration, with two longitudinally beams connected by two cross-members which are longitudinal spaced apart from each other, the two longitudinal beams having their ends connected to the motor-vehicle structure by the elastic supports.

11. The suspension system of claim 1 wherein said leaf spring consists of a composite material.

* * * * *